US007164650B2

(12) United States Patent
Kim et al.

(10) Patent No.: US 7,164,650 B2
(45) Date of Patent: Jan. 16, 2007

(54) METHOD FOR TRANSMITTING/RECEIVING INFORMATION ABOUT ORTHOGONAL VARIABLE SPREADING FACTOR CODES ASSIGNED TO USER DATA IN A HIGH SPEED DATA PACKET ACCESS COMMUNICATION SYSTEM

(75) Inventors: Sung-Hoon Kim, Seoul (KR); Hyun-Woo Lee, Suwon-shi (KR); Kook-Heui Lee, Songnam-shi (KR); Ju-Ho Lee, Suwon-shi (KR); Sung-Ho Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1061 days.

(21) Appl. No.: 10/218,158

(22) Filed: Aug. 12, 2002

(65) Prior Publication Data

US 2003/0108025 A1   Jun. 12, 2003

(30) Foreign Application Priority Data

Aug. 11, 2001   (KR)   ............................... 2001-48580

(51) Int. Cl.
*H04J 11/00* (2006.01)
(52) U.S. Cl. ...................................... 370/208; 370/509
(58) Field of Classification Search ................ 370/203, 370/208, 506, 508, 509, 510, 512, 514, 471, 370/441, 442, 347, 342–344, 349, 319–321
See application file for complete search history.

(56) References Cited

U.S. PATENT DOCUMENTS 6,683,903 B1 *   1/2004   Wang ......................... 375/130

7,054,633 B1 *   5/2006   Seo et al. .................... 455/439
2003/0002472 A1 *   1/2003   Choi et al. .................. 370/347

FOREIGN PATENT DOCUMENTS

EP   1 035 676   9/2000

OTHER PUBLICATIONS

Motorola: "HSDPA Signaling Requirements", TSG-RAN Working Group 2, Edinburgh, United Kingdom, Jan. 15-19, 2001.
Nokia: "HSDPA Related Signaling Parameters in Downlink, Version 2", TSG-RAN WG2 #21 meeting, Busan, Korea, May 21-25, 2001.
Nokia: "HSDPA Related Signaling Parameters in Downlink", TSG-RAN WG1/WG2 adhoc on HSDPA, France, Apr. 5-6, 2001.

* cited by examiner

*Primary Examiner*—Brenda Pham
(74) *Attorney, Agent, or Firm*—The Farrell Law Firm

(57) ABSTRACT

A method of transmitting and receiving information about successive orthogonal codes assigned to user data for spreading on a control channel before transmission of the user data on a plurality of code channels in an HSDPA (High Speed Data Packet Access) communication system. A Node B determines an offset between a starting orthogonal code among the assigned orthogonal codes and the first of a plurality of successive orthogonal codes available to the HSDPA communication system, determines the number of the assigned orthogonal codes counted from the starting orthogonal code being the number of the code channels, forms orthogonal code information indicating the offset and the number of the orthogonal codes, and transmits the orthogonal code information to a UE.

18 Claims, 5 Drawing Sheets

METHOD FOR TRANSMITTING/RECEIVING INFORMATION ABOUT ORTHOGONAL VARIABLE SPREADING FACTOR CODES ASSIGNED TO USER DATA IN A HIGH SPEED DATA PACKET ACCESS COMMUNICATION SYSTEM

PRIORITY

This application claims priority to an application entitled "Method of Transmitting/Receiving Information about Orthogonal Variable Spreading Factor Codes Assigned to User Data in High Speed Data Packet Access Communication System" filed in the Korean Industrial Property Office on Aug. 11, 2001 and assigned Serial No. 2001-48580, the contents of which are hereby incorporated by reference.

BACKGROUND OF THE INVENTION

1. Field of the Invention

The present invention relates generally to an HSDPA (High Speed Data Packet Access) communication system, and in particular, to a method of transmitting/receiving information about OVSF (Orthogonal Variable Spreading Factor) codes assigned to user data.

2. Description of the Related Art

HSDPA is a generic term that refers to data transmission schemes that bring high-speed data delivery to terminals by means of the HS-DSCH (High Speed-Downlink Shared Channel) and its related control channels in UMTS (Universal Mobile Telecommunications System). To support HSDPA, AMC (Adaptive Modulation and Coding) scheme, HARQ (Hybrid Automatic Retransmission Request) scheme, and FCS (Fast Cell Selection) have been proposed.

A. AMC (Adaptive Modulation and Coding)

AMC is a scheme for adapting the modulation and coding format based on a received signal quality of a UE (User Equipment) and a channel condition between a particular Node B and the UE to increase a use efficiency of an entire cell. Therefore, the AMC scheme involves a plurality of MCSs (modulation and coding schemes). The MCSs can be defined from level 1 to level n. In other words, the AMC scheme is an adaptive selection of an MCS level according to the channel condition between the UE and the serving Node B.

B. FCS (Fast Cell Selection)

When the UE enters a soft handover region, it selects the cell that is best able to transmit the required data. When a UE supporting HSDPA enters a soft handover region defined as the overlapped region of a first Node B and a second Node B, it establishes radio links with the Node Bs. The cells of the Node Bs that have radio links with the UE are the active set of the UE. Data delivery from only the best cell in a channel condition in the active set is FCS. Here, the best cell is a cell that has the best channel condition among the cells in the active set. The UE periodically monitors the channel conditions with the cells in the active set to check whether there is a cell better than the present best cell. If such a cell is detected, the UE transmits a Best Cell Indicator (BCI) to the cells in the active set to change the best cell. The BCI contains the identification (ID) of the new best cell. Upon receipt of the BCI, the cells determine whether the BCI indicates them. Then, the new best cell transmits an HSDPA packet to the UE on an HS-DSCH, thus reducing the overall interference.

C. N-channel SAW HARQ (N-channel Stop and Wait Hybrid Automatic Retransmission Request) Scheme Two schemes are introduced to increase typical ARQ (Automatic Retransmission Request) efficiency. That is, a retransmission request and a response for the retransmission request are exchanged between a UE and a Node B, and defective data is temporarily stored and combined with corresponding retransmitted data. n-channel SAW HARQ scheme has been introduced to HSDPA to make up for the weak points in the conventional SAW ARQ scheme. In the SAW ARQ scheme, the next packet data is not transmitted until an ACK (Acknowledgement) signal for the previous transmitted packet data is received. Thus although the packet data can be transmitted, it is delayed to await the ACK signal. On the other hand, packet data can be successively transmitted without receiving the ACK signal for the previous packet data in the n-channel SAW HARQ, thereby increasing the use efficiency of channels. If n logical channels are established between a UE and a Node B, and identified by time or channel numbers, the UE, upon receipt of packet data at a certain timing point, can determine the logical channel that transmitted the packet data. Thus the UE can rearrange packet data in the right reception order or soft-combine the packet data.

A plurality of UEs share part of downlink transmission resources in an HSDPA communication system. The downlink transmission resources include transmission power and OVSF codes. Use of 10 OVSF codes when SF (Spreading Factor)=16 and use of 20 OVSF codes when SF=32 in the HSDPA communication system are under discussion.

A plurality of UEs can share a plurality of available OVSF codes at the same time, that is, which implies that OVSF code multiplexing is possible for the UEs at a certain time in the HSDPA communication system. OVSF code multiplexing will be described with reference to FIG. 1.

FIG. 1 illustrates an example of OVSF code assignment in a typical HSDPA communication system when SF=16. Referring to FIG. 1, each OVSF code is expressed as C(i, j) according to its position in a code tree. In C(i, j), the variable i indicates the SF and the variable j is a sequence number indicating the position of the OVSF code from the leftmost end of the code tree. For example, C(16, 0) represents the first OVSF code with SF=16 counted from the left in the code tree. As illustrated, the $7^{th}$ to $16^{th}$ OVSF codes with SF=16, that is, 10 OVSF codes C(16, 6) to C(16, 15) are assigned. The 10 OVSF codes can be multiplexed for a plurality of UEs as illustrated in Table 1.

TABLE 1

| Time | UE | | |
|---|---|---|---|
|  | t0 | t1 | t2 |
| A | C(16, 6)~C(16, 7) | C(16, 6)~C(16, 8) | C(16, 6)~C(16, 10) |
| B | C(16, 8)~C(16, 10) | C(16, 9)~C(16, 10) | C(16, 11)~C(16, 14) |
| C | C(16, 11)~C(16, 15) | C(16, 11)~C(16, 15) | C(16, 15) |

In Table 1, UEs A, B, and C perform code multiplexing on their respective assigned OVSF codes at timing points t0, t1, and t2. A Node B determines the number of OVSF codes and their positions in the code tree to be assigned to each UE according to the amount of user data for the each UE and the channel condition between the Node B and the each UE.

It has been proposed that the OVSF code information is delivered to each UE on a downlink control channel in the HSDPA communication system. First a channel structure in the HSDPA communication system will be described.

The HSDPA communication system has an HS-DSCH for transmitting downlink user data, a downlink control channel, and an uplink control channel. The HS-DSCH transmits the UEs user data using the OVSF codes assigned to the HSDPA communication system. To support an AMC scheme, a HARQ scheme, and an FCS scheme, control information must be exchanged between the Node B and the UEs via the downlink and uplink control channels.

The uplink control channel transmits a periodical CQI (Channel Quality Information), ACK (Acknowledgement)/NACK (Negative ACK) signals indicating whether received user data has an error or not, and a best cell information. The downlink control channel transmits a particular UE an HI (HS-DSCH Indicator) indicating that the UE will receive user data on the HS-DSCH, an MCS level to be used for the data transmission, and information about OVSF codes to be assigned.

FIG. 2 is a block diagram of a transmitter for transmitting information about OVSF codes assigned to user data in the typical HSDPA communication system. Referring to FIG. 2, the transmitter takes charge of user data transmission on the HS-DSCH and control information transmission on the downlink control channel in a Node B of the HSDPA communication system. The transmitter includes an AMC controller 201, a scheduler 202, a transmission buffer 203, a turbo encoder 204, a user data transmitter 205, a control information generator 206, a channel encoder 207, and a control data transmitter 208. The transmission buffer 203 buffers user data received from a higher layer and outputs the user data to the turbo encoder 204 under the control of the scheduler 202. The turbo encoder 204 turbo-encodes the user data under the control of the AMC controller 201. The AMC controller 201 determines an MCS level for the user data according to the channel condition between the Node B and a UE, and controls the turbo encoder 204 to encode the user data according to the MCS level. The user data transmitter 205 modulates the encoded user data according to the MCS level, channelizes the modulated data, and transmits the user data to the UE.

The scheduler 202 controls information about OVSF codes used for the channelization and determines a user data transmission time and OVSF codes to be used for the UE, taking into account the amount and types of user data for other UEs.

The control information generator 206 converts information about the determined MCS level received from the AMC controller 201 and the OVSF code information received from the scheduler 202 to a format suitable for a radio channel. If the control information is to be transmitted on a DPCCH (Dedicated Physical Control Channel), the control information generator 206 converts the control information to a DPCCH transmit format. The channel encoder 207 channel-encodes the control information received from the control information generator 206 with a channel encoding scheme. Here, the channel encoding scheme is convolutional coding or turbo coding. The control data transmitter 208 performs modulation and channelization on the encoded control information and transmits the control information to the UE on a radio link.

FIG. 3 is a block diagram of a receiver for receiving OVSF code information in the typical HSDPA communication system. Referring to FIG. 3, the receiver receives user data on the HS-DSCH and control information on a downlink control channel in the UE. The receiver is comprised of a control data receiver 301, a channel decoder 302, a control information interpreter 303, a user data receiver 304, a turbo decoder 305, and a reception buffer 306.

Upon receipt of data on a radio link, the data is fed to the control data receiver 301 and the user data receiver 304. The radio link is a channel predetermined between the Node B and the UE for transmitting downlink control information, for example, a DPCCH. The control data receiver 301 despreads and demodulates the received data.

The channel decoder 302 channel-decodes the signal received from the control data receiver 301 in correspondence to the channel encoding scheme used in the transmitter. The control information interpreter 303 interprets MCS level information and OVSF code information from the control data received from the channel decoder 302. The MCS level information is output to the user data receiver 304 and the turbo decoder 305, and the OVSF code information is output to the user data receiver 304. The user data receiver 304 despreads and demodulates the received data using the OVSF code information and the MCS level information.

The turbo decoder 305 turbo-decodes the signal received from the user data receiver 304 in correspondence to the turbo coding scheme used in the transmitter using the MCS level information. The reception buffer 306 buffers the turbo-decoded signal and delivers the buffered user data to a higher layer at a particular timing point under a predetermined control. Thus, the receiver receives user data from the Node B on the radio link using the OVSF code and MCS level information.

As described above, the transmitter must transmit information about OVSF codes assigned to user data so that the receiver can detect the user data using the OVSF code information in the HSDPA communication system. Therefore, an efficient way of transmitting OVSF code information so that the first OVSF code and the number of OVSF codes to be assigned to user data are notified to the UE is under consideration.

Taking the situation specified by Table 1 as an example, in order to transmit user data to a UE A using OVSF codes C(16, 5) and C(16, 6) at time t0, information about the OVSF codes must be transmitted to the UE A earlier than time t0. The OVSF code information may be constructed as illustrated in Table 2.

TABLE 2

| Time | UE | | |
|---|---|---|---|
| | t0 | t1 | t2 |
| A | C(16, 6)~C(16, 7) SP: 0110 NC: 0010 | C(16, 6)~C(16, 8) SP: 0110 NC: 0011 | C(16, 6)~C(16, 10) SP: 0110 NC: 0100 |
| B | C(16, 8)~C(16, 10) SP: 1000 NC: 0011 | C(16, 9)~C(16, 10) SP: 1001 NC: 0010 | C(16, 11)~C(16, 14) SP: 1011 NC: 0100 |
| C | C(16, 11)~C(16, 15) SP: 1011 NC: 0101 | C(16, 11)~C(16, 15) SP: 1011 NC: 0100 | C(16, 15) SP: 1111 NC: 0001 |

In Table 2, SP (Start Point) represents a starting point of OVSF code assigned to user data in an OVSF code tree. The left most OVSF code is expressed as 0000 and the right most OVSF code is expressed as 1111. NC (Number of Code) is the number of OVSF codes assigned to the user data, expressed as a binary number. When 10 OVSF codes with SF=16 are assigned to an HSDPA communication system, expression of the SP requires 4 bits and expression of the NC requires 4 bits. Thus OVSF code information is delivered in the remaining 8 bits.

To generalize the expression of the OVSF code information, the number of bits for representing the SP is $R(\log_2 n)$ when NH OVSF (Number of Codes for HSDPA) codes with SF=n are assigned to the HSDPA communication system. Here, $R(x)$ is an integer equal to or greater than a real number x. If a plurality of OVSF codes are assigned to a UE, the OVSF codes are assumed to be successive on the OVSF code tree.

The OVSF code information expressed as the SP and NC is part of the control information that was described referring to FIGS. 2 and 3 as being transmitted from the Node B to the UE via the radio link. Since the OVSF code information is transmitted to the UE on a downlink control channel, for example, a DPCCH, each time user data is transmitted on the HS-DSCH, it is preferable to minimize the size of the OVSF code information. However, the OVSF code information expressed as an SP and an NC requires more bits than are actually needed.

SUMMARY OF THE INVENTION

It is, therefore, an object of the present invention to provide a method of transmitting/receiving information about OVSF codes assigned to user data in an HSDPA communication system.

It is another object of the present invention to provide a method of transmitting/receiving information about an offset and a number of OVSF codes assigned to user data as OVSF code information.

To achieve the above and other objects, a Node B determines an offset between a starting orthogonal code among assigned successive orthogonal codes and a first of a plurality of successive orthogonal codes available to an HSDPA communication system, determines a number of the assigned orthogonal codes counted from the starting orthogonal code being a number of the code channels, forms orthogonal code information indicating the offset and the number of the orthogonal codes, and transmits the orthogonal code information to a UE.

To achieve the above and other objects, a method of assigning a successive orthogonal codes, assigned orthogonal codes, for an HSDPA (High Speed Data Packet Access) communication system having a maximum number of orthogonal codes N for spreading the HSDPA data, the method comprising the steps of: determining an offset indicating a starting point of the successive orthogonal codes from the first orthogonal code of the N number of orthogonal codes and a number of orthogonal codes being assigned; and transmitting the offset and the number of assigned orthogonal codes to a UE, wherein one of the offset and the number of orthogonal codes represented by a first number of bits equal to a number of bits used for indicating the N and the other is represented by a second number of bits which is 1 bit smaller than the first number of bits. To achieve the above and other objects, a method of receiving user data and information about assigned orthogonal codes, a successive orthogonal codes, for an HSDPA (High Speed Data Packet Access) communication system having a maximum number of orthogonal codes N for spreading the HSDPA data, the method comprising the steps of: detecting an offset indicating a starting point of the assigned orthogonal codes from the first orthogonal code of the N number of orthogonal codes and a number of orthogonal codes being assigned; and receiving a user data on a assigned code channels using the assigned orthogonal codes, wherein one of the offset and the number of orthogonal codes is represented by a first number of bits equal to a number of bits used for indicating the maximum number of codes N and the other is represented by a second number of bits which is 1 bit smaller than the first number of bits.

BRIEF DESCRIPTION OF THE DRAWINGS

The above and other objects, features and advantages of the present invention will become more apparent from the following detailed description when taken in conjunction with the accompanying drawings in which.

FIG., 4 is a block diagram of a transmitter for transmitting information about OVSF codes assigned to user data in an HSDPA communication system according to an embodiment of the present invention.

DETAILED DESCRIPTION OF THE PREFERRED EMBODIMENT

Figure 1:
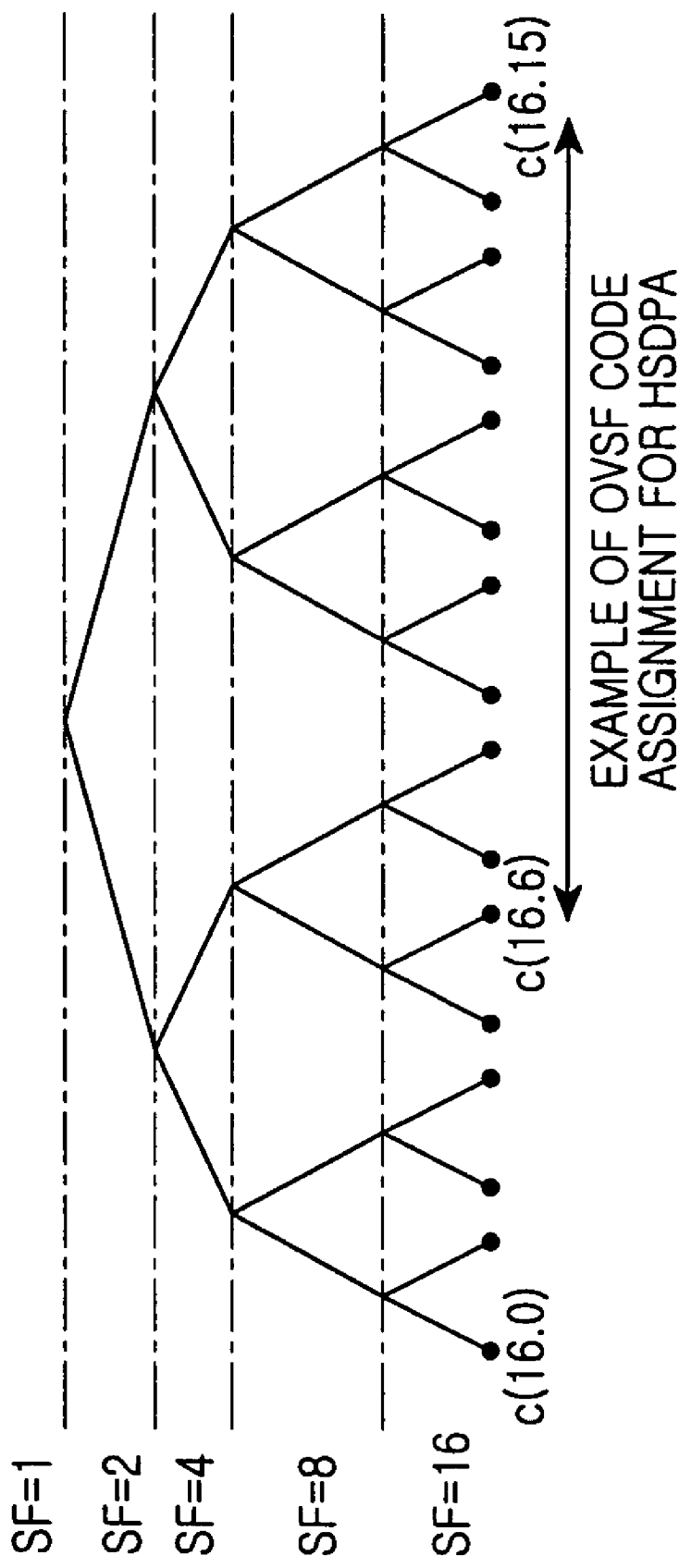
FIG. 1 illustrates an-example of OVSF code assignment to a typical HSDPA communication system.
Figure 2:
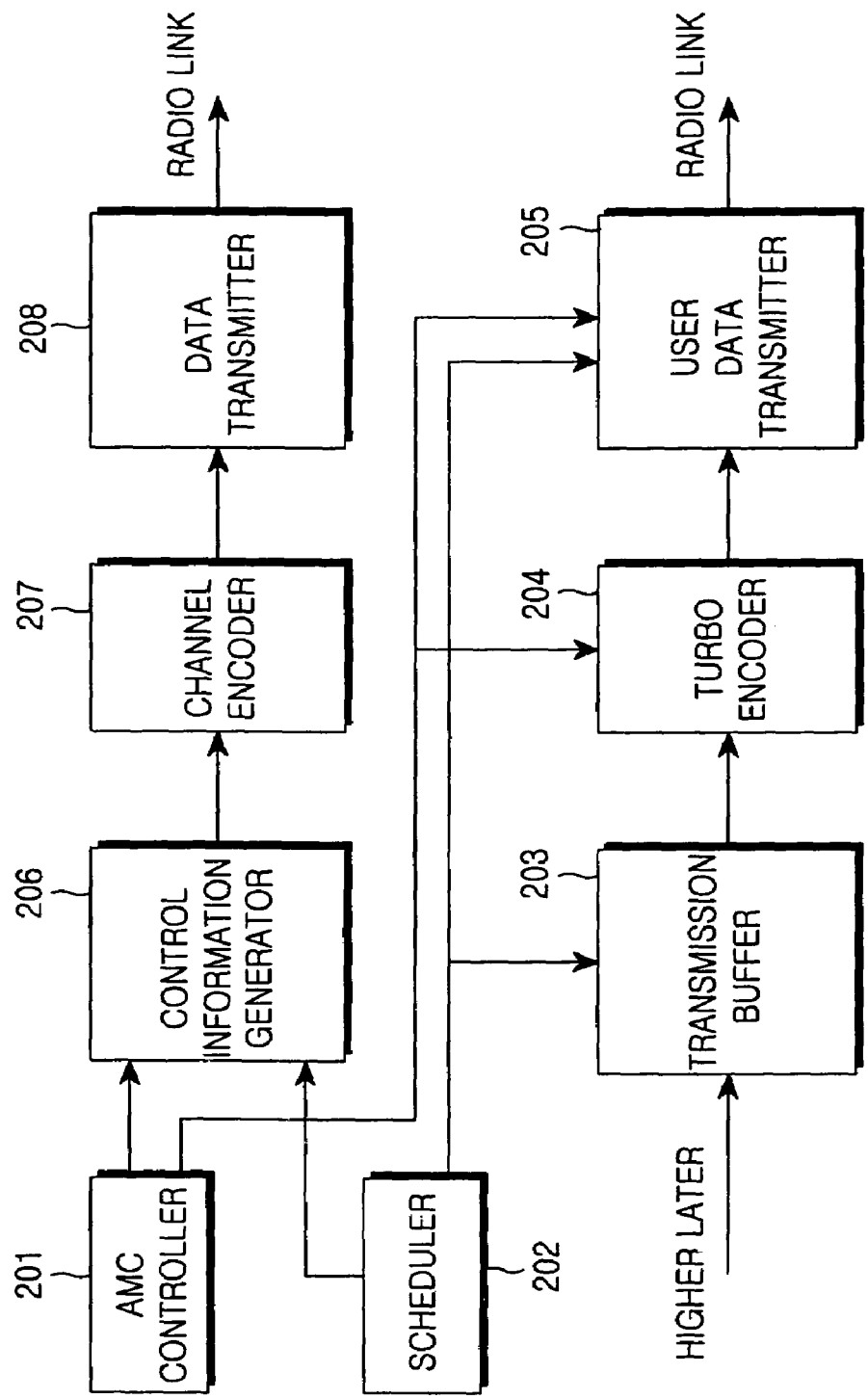
FIG. 2 is a block diagram of a transmitter for transmitting information about OVSF codes assigned to user data in the typical HSDPA communication system.
Figure 3:
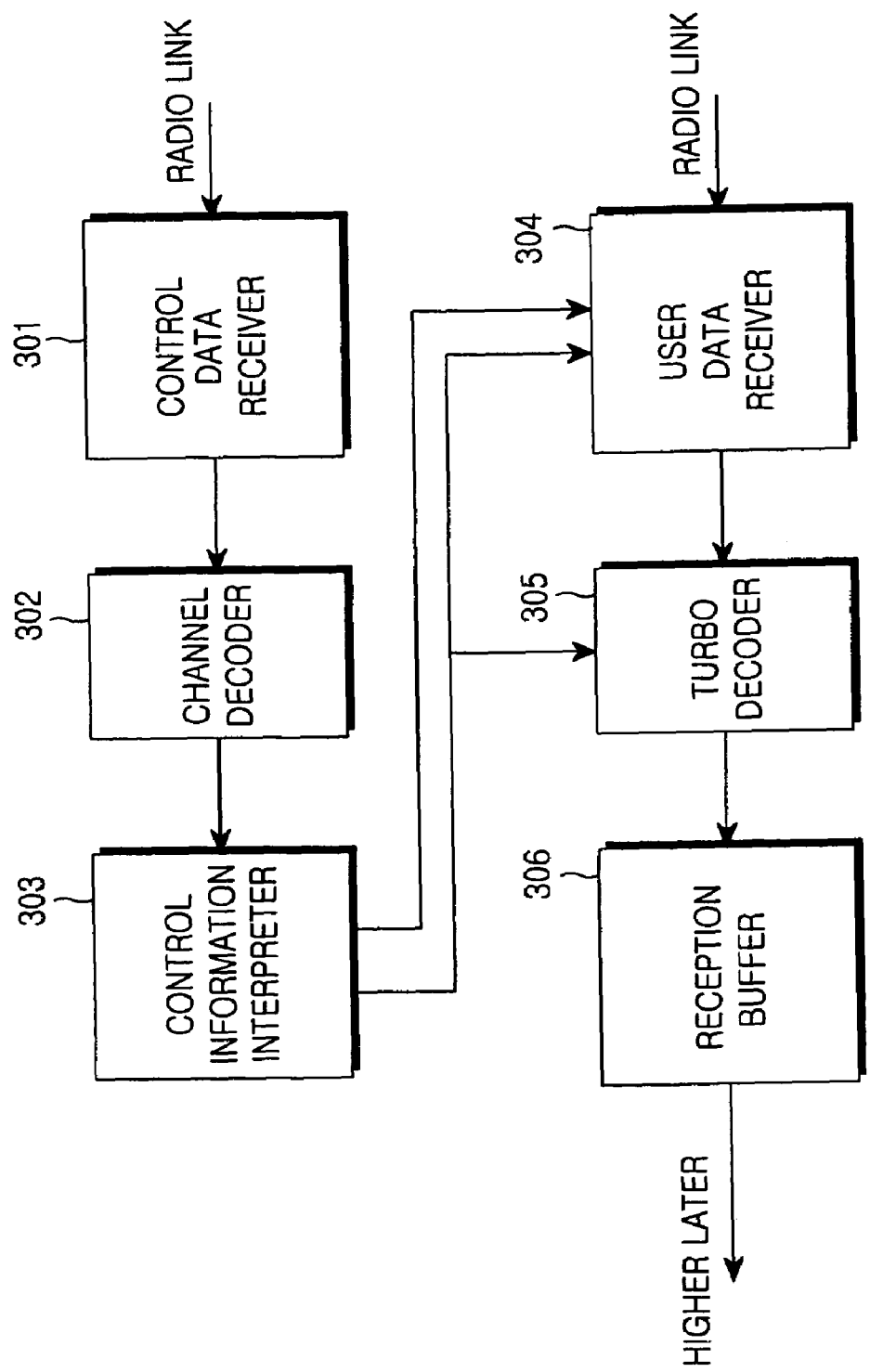
FIG. 3 is a block diagram of a receiver for receiving the OVSF code information in the typical HSDPA communication system.

A preferred embodiment of the present invention will be described herein below with reference to the accompanying drawings. In the following description, well-known functions or constructions are not described in detail since they would obscure the invention in unnecessary detail.

In the present invention, OVSF code information to be transmitted from a Node B to a UE in an HSDPA communication system is generated for each available OVSF code assignment for a UE. When an OVSF code assignment is determined for the UE, corresponding OVSF code information including the offset and the number of assigned OVSF codes is transmitted to the UE. Here, the offset is the stating point of OVSF code assigned to user data for the UE in a OVSF code tree.

Generation of the OVSF code information with the available OVSF code assignment considered will be described on the assumption that 10 OVSF codes with SF=16 (that is, the $7^{th}$ to $16^{th}$ OVSF codes), for example, C(16,6) to C(16,15), are assigned to the HSDPA communication system. All available OVSF code assignments for the UE are listed in Table 3.

TABLE 3

| Number of OVSF codes | Number of possible cases | OVSF codes |
|---|---|---|
| 10 | 1 | [C(16, 6)~C(16, 15)] |
| 9 | 2 | [C(16, 6)~C(16, 14)], [C(16, 7)~C(16, 15)] |
| 8 | 3 | [C(16, 6)~C(16, 13)], [C(16, 7)~C(16, 14)], [C(16, 8)~C(16, 15)] |
| 7 | 4 | [C(16, 6)~C(16, 12)], [C(16, 7)~C(16, 13)], [C(16, 8)~C(16, 14)], [C(16, 9)~C(16, 15)] |
| 6 | 5 | [C(16, 6)~C(16, 11)], [C(16, 7)~C(16, 12)], [C(16, 8)~C(16, 13)], [C(16, 9)~C(16, 14)], [C(16, 10)~C(16, 15)] |
| 5 | 6 | [C(16, 6)~C(16, 10)], . . . , [C(16, 11)~C(16, 15)] |

TABLE 3-continued

| Number of OVSF codes | Number of possible cases | OVSF codes |
|---|---|---|
| 4 | 7 | [C(16, 6)~C(16, 9)], . . . , [C(16, 12)~C(16, 15)] |
| 3 | 8 | [C(16, 6)~C(16, 8)], . . . , [C(16, 13)~C(16, 15)] |
| 2 | 9 | [C(16, 6), C(16, 7)], . . . , [C(16, 14)~C(16, 15)] |
| 1 | 10 | [C(16, 6)], . . . , [C(16, 15)] |

Referring to Table 3, when the number (NU) of OVSF codes assigned to the UE is equal to the number (NH) of all OVSF codes available in the HSDPA communication system, the number of possible cases is 1. When NU is less than NH by 1, that is, NU is 9, the number of possible cases is 2, that is, [C(16, 6)~C(16, 14)] or [C(16, 7)~C(16, 15)] are assigned to the UE. If NU is 8, the number of possible cases is 3.

Therefore, the total number of codes (TNC) of all possible cases for the UE in the HSDPA communication system is calculated by $$TNC = \sum_{NU=1}^{NH} NH - NU + 1 \quad (1)$$

Then, the number of bits required to express OVSF code information is $R(\log_2 TNC)$.

Comparisons between the number of bits required to express the conventional OVSF code information and the number of bits required to express the OVSF code information in the present invention are illustrated in Table 4.

TABLE 4

| | Number of bits for conventional OVSF code information | Number of bits for inventive OVSF code information |
|---|---|---|
| SF = 16, NH = 10 | $R(\log_2 16) + R(\log_2 10) = 8$ | $R(\log_2 55) = 6$ |
| SF = 32, NH = 20 | $R(\log_2 32) + R(\log_2 20) = 10$ | $R(\log_2 210) = 8$ |
| SF = 64, NH = 40 | $R(\log_2 64) + R(\log_2 40) = 12$ | $R(\log_2 820) = 10$ |

As noted from Table 4, the OVSF code information of the present invention can be transmitted in fewer bits than the conventional OVSF code information. While the OVSF code information is formed independently to indicate the SP and NC of an OVSF code assignment in the conventional technology, the OVSF code information is generated for each of all possible OVSF code assignments for a UE and stored in a table, and when particular OVSF codes are assigned to the UE, a logical indicator corresponding to the OVSF code information in the table is transmitted to the UE in the present invention. The procedure of forming the OVSF code information corresponding to each OVSF code assignment is performed in a known manner and thus its description is avoided here. The logical indicator indicates the offset and number of assigned OVSF codes.

The OVSF code information of all possible cases can be mapped to logical indicators in many ways. For example, OVSF code information for the case where NU=NH is set to be 0 and then OVSF code information for each of the other cases is set to be increased by 1 from the previous OVSF code information, or vice versa.

Table 5 illustrates OVSF code information mapping to logical indicators when the $7^{th}$ to $16^{th}$ OVSF codes with SF=16 in the code tree, that is, C(16, 6) to C(16, 15) are assigned to the HSDPA communication system.

TABLE 5

| SP | NC | Logical indicator | SP | NC | Logical indicator |
|---|---|---|---|---|---|
| C(16, 6) | 10 | 000000 | C(16, 6) | 3 | 011100 |
| C(16, 6) | 9 | 000001 | C(16, 7) | 3 | 011101 |
| C(16, 7) | 9 | 000010 | C(16, 8) | 3 | 011110 |
| C(16, 6) | 8 | 000011 | C(16, 9) | 3 | 011111 |
| C(16, 7) | 8 | 000100 | C(16, 10) | 3 | 100000 |
| C(16, 8) | 8 | 000101 | C(16, 11) | 3 | 100001 |
| C(16, 6) | 7 | 000110 | C(16, 12) | 3 | 100010 |
| C(16, 7) | 7 | 000111 | C(16, 13) | 3 | 100011 |
| C(16, 8) | 7 | 001000 | C(16, 6) | 2 | 100100 |
| C(16, 9) | 7 | 001001 | C(16, 7) | 2 | 100101 |
| C(16, 6) | 6 | 001010 | C(16, 8) | 2 | 100110 |
| C(16, 7) | 6 | 001011 | C(16, 9) | 2 | 100111 |
| C(16, 8) | 6 | 001100 | C(16, 10) | 2 | 101000 |
| C(16, 9) | 6 | 001101 | C(16, 11) | 2 | 101001 |
| C(16, 10) | 6 | 001110 | C(16, 12) | 2 | 101010 |
| C(16, 6) | 5 | 001111 | C(16, 13) | 2 | 101011 |
| C(16, 7) | 5 | 010000 | C(16, 14) | 2 | 101100 |
| C(16, 8) | 5 | 010001 | C(16, 6) | 1 | 101101 |
| C(16, 9) | 5 | 010010 | C(16, 7) | 1 | 101110 |
| C(16, 10) | 5 | 010011 | C(16, 8) | 1 | 101111 |
| C(16, 11) | 5 | 010100 | C(16, 9) | 1 | 110000 |
| C(16, 6) | 4 | 010101 | C(16, 10) | 1 | 110001 |
| C(16, 7) | 4 | 010110 | C(16, 11) | 1 | 110010 |
| C(16, 8) | 4 | 010111 | C(16, 12) | 1 | 110011 |
| C(16, 9) | 4 | 011000 | C(16, 13) | 1 | 110100 |
| C(16, 10) | 4 | 011001 | C(16, 14) | 1 | 110101 |
| C(16, 11) | 4 | 011010 | C(16, 15) | 1 | 110110 |
| C(16, 12) | 4 | 011011 | | | |

The above OVSF code information table may be generated by the Node B, or a higher layer, for example, a RNC (Radio Network Controller).

Now a description will be made of a transmitter and a receiver for transmitting and receiving OVSF code information using the OVSF code information table in the HSDPA communication system with reference to FIGS. 4 and 5.

Figure 4:
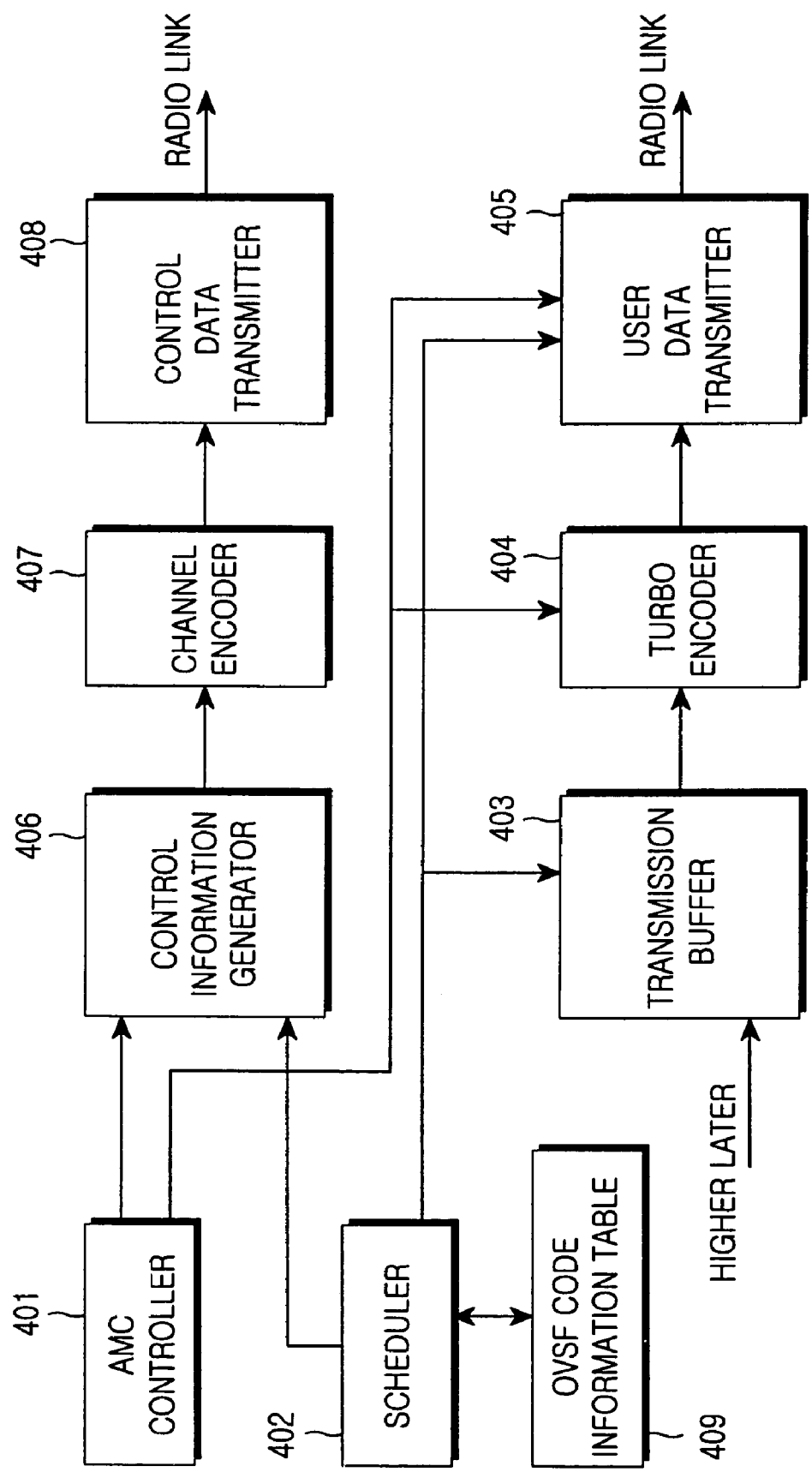

FIG. 4 is a block diagram of a transmitter for transmitting information about OVSF codes assigned to user data in an HSDPA communication system according to an embodiment of the present invention. In FIG. 4, the transmitter transmits user data on the HS-DSCH and control information on the downlink control channel in a Node B of the HSDPA communication system. The transmitter is comprised of an AMC controller 401, a scheduler 402, a transmission buffer 403, a turbo encoder 404, a user data transmitter 405, a control information generator 406, a channel encoder 407, a control data transmitter 408, and an OVSF code information table 409.

The transmission buffer 403 buffers user data generated in a higher layer and outputs the user data to the turbo encoder 404 under the control of the scheduler 402. The turbo encoder 404 turbo-encodes the user data under the control of the AMC controller 401. The user data transmitter 405 modulates the turbo-encoded signal according to an MCS level received from the AMC controller 401, channelizes the modulated signal according to OVSF code information received from the scheduler 402, and transmits the resulting signal to a corresponding UE on a radio link. The AMC controller 401 determines the MCS level and modulation scheme suitable for the UE based on control information received from the UE.

The scheduler 402 determines the transmission time and OVSF codes of the user data for the UE, taking into account the amount and types of user data for other UEs supporting HSDPA. Then the scheduler 402 searches for a logical indicator corresponding to the OVSF code assignment in the OVSF code information table 409 and outputs the logical indicator to the control information generator 406. The AMC controller 401 also feeds the MCS level information to the control information generator 406.

The control information generator 406 converts the MCS level information and the logical indicator in a format suitable for a radio channel. For example, if a DPCCH transmits the control information, the control information generator 406 converts the control information in the transmit format of the DPCCH. The channel encoder 407 channel-encodes the control information received from the control information generator 406 by a channel encoding scheme, for example, a convolutional coding scheme or a turbo coding scheme. The control data transmitter 408 performs modulation and channelization on the channel-encoded control information and transmits the resulting control information to the UE on the radio link.

Figure 5:
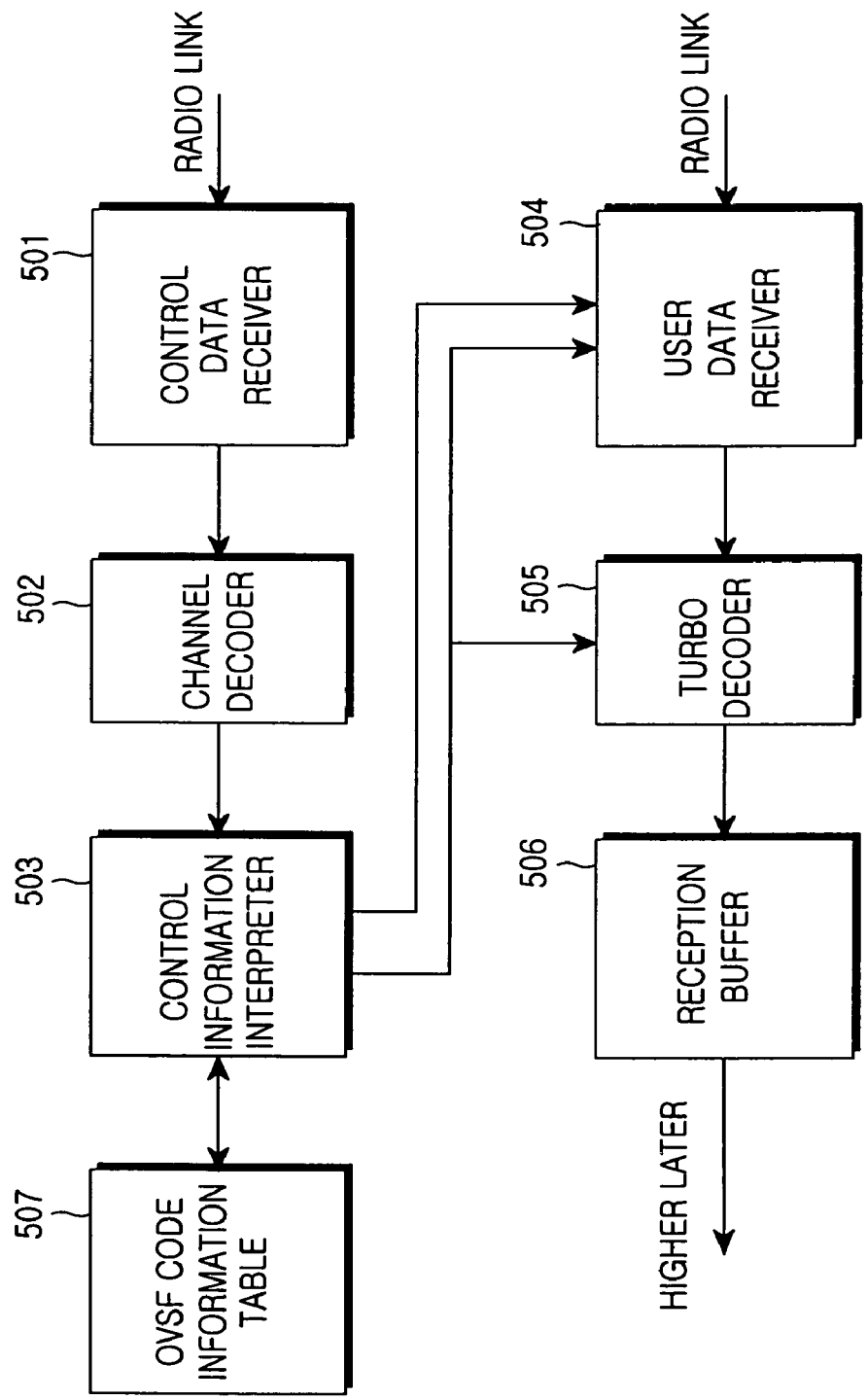
FIG. 5 is a block diagram of a receiver for receiving the OVSF code information in the HSDPA communication system according to the embodiment of the present invention.

FIG. 5 is a block diagram of a receiver for receiving the OVSF code information in the HSDPA communication system according to the embodiment of the present invention.

In FIG. 5, the receiver receives user data on the HS-DSCH and control information on a downlink control channel in the UE in correspondence to the channel encoding scheme used in the transmitter. The receiver is comprised of a control data receiver 501, a channel decoder 502, a control information interpreter 503, a user data receiver 504, a turbo decoder 505, a reception buffer 506, and an OVSF code information table 507.

Upon receipt of data on a radio link, the data is fed to the control data receiver 501 and the user data receiver 504. The radio link is a channel predetermined between the Node B and the UE for transmitting downlink control information, for example, a DPCCH. The control data receiver 501 despreads and demodulates the data.

The channel decoder 502 channel-decodes the signal received from the control data receiver 501. The control information interpreter 503 interprets MCS level information and OVSF code information from the control data received from the channel decoder 502. The MCS level information is output to the user data receiver 504 and the turbo decoder 505, and the OVSF code information is output to the user data receiver 504.

To interpret the OVSF code information, the control information interpreter 503 detects a logical indicator representing the OVSF code information from the received control data, searches for the OVSF code information indicative of an offset and an NC in correspondence with the logical indicator in the OVSF code information table 507, and outputs the OVSF code information to the user data receiver 504. Using the MCS level information and the OVSF code information, the UE receives user data from the Node B on the radio link.

The user data receiver 504 despreads and demodulates the received data using the OVSF code information and the MCS level information. The turbo decoder 505 turbo-decodes the signal received from the user data receiver 504 in correspondence to the turbo encoding scheme used in the transmitter using the MCS level information. The reception buffer 506 buffers the turbo-decoded signal and delivers the buffered user data to a higher layer at a particular time under predetermined control.

In accordance with the present invention as described above, OVSF code information is formed to indicate the offset and the number of assigned OVSF codes in each of all possible cases of OVSF code assignment and mapped to logical indicators in a table in an HSDPA communication system. Referring to the OVSF code information table, OVSF code information corresponding to an OVSF code assignment for a UE is transmitted to the UE as a corresponding logical indicator. The thus-formed OVSF code information requires a smaller number of bits than in the conventional OVSF code information. Therefore, both the efficiency of the information transmission/reception and resource efficiency are increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting information about successive orthogonal codes assigned to user data for spreading on a control channel before transmitting the user data on a plurality of code channels to a UE (User Equipment) in a Node B of an HSDPA (High Speed Data Packet Access) communication system, the method comprising the steps of:
   determining an offset between a starting orthogonal code among a assigned orthogonal codes and a first of a plurality of successive orthogonal codes available to the HSDPA communication system;
   determining a number of the assigned orthogonal codes counted from the starting orthogonal code being a number of the plurality of code channels; and
   forming orthogonal code information indicating the offset and the number of the orthogonal codes and transmitting the orthogonal code information to the UE.

2. The method of claim 1, wherein the orthogonal code information is mapped to one of a plurality of logical indicators predetermined between the UE and the Node B.

3. The method of claim 2, wherein each of the plurality of logical indicators is mapped to one of a plurality of pieces of orthogonal code information generated for each possible case of orthogonal code assignment.

4. The method of claim 1, wherein the orthogonal codes are OVSF (Orthogonal Variable Spreading Factor) codes.

5. A method of assigning a successive orthogonal codes, assigned orthogonal codes, for an HSDPA (High Speed Data Packet Access) communication system having a maximum number of orthogonal codes N for spreading the HSDPA data, the method comprising the steps of:
   determining an offset indicating a starting point of the successive orthogonal codes from the first orthogonal code of the N number of orthogonal codes and a number of orthogonal codes being assigned; and
   transmitting the offset and the number of assigned orthogonal codes to a UE.

6. The method of claim 5, wherein at least one of the offset and the number of orthogonal codes consists of a number of bits indicating the maximum number of orthogonal codes N.

7. The method of claim 5, wherein one of the offset and the number of orthogonal codes represented by a first number of bits equal to a number of bits used for indicating the N and the other is represented by a second number of bits which is 1 bit smaller than the first number of bits.

8. A method of receiving information about orthogonal codes assigned to user data for spreading on a control channel from a Node B before the user data is received from the Node B on a plurality of code channels in a UE (User Equipment) of an HSDPA (High Speed Data Packet Access) communication system, the method comprising the steps of:

despreading a predetermined received channel signal;

detecting orthogonal code information of the user data from the despread channel signal; and detecting an offset between a starting orthogonal code among a plurality of assigned successive orthogonal codes and a first of a plurality of successive orthogonal codes available to the HSDPA communication system and a number of the orthogonal codes being number of the code channels from the orthogonal code information.

9. The method of claim 8, wherein the orthogonal code information is mapped to one of a plurality of logical indicators predetermined between the UE and the Node B.

10. The method of claim 9, wherein each of the plurality of logical indicators is mapped to one of a plurality of pieces of orthogonal code information generated for each possible case of orthogonal code assignment.

11. The method of claim 8, wherein the orthogonal codes are OVSF (Orthogonal Variable Spreading Factor) codes.

12. A method of transmitting and receiving information about successive orthogonal codes assigned to user data for spreading before the user data is transmitted and received on a plurality of code channels in an HSDPA (High Speed Data Packet Access) communication system, the method comprising the steps of:

forming orthogonal code information indicating an offset between a starting orthogonal code among the assigned orthogonal codes and a first of a plurality of successive orthogonal codes available to the HSDPA communication system and a number of the assigned orthogonal codes counted from the starting orthogonal code being a number of the plurality of code channels by a Node B;

transmitting the orthogonal code information to a UE (User Equipment) on a predetermined channel by the Node B;

receiving the predetermined channel and detecting the orthogonal code information from the channel signal by the UE; and detecting the offset and the number of the orthogonal codes from the orthogonal code information by the UE.

13. The method of claim 12, wherein the orthogonal code information is mapped to one of a plurality of logical indicators predetermined between the UE and the Node B.

14. The method of claim 13, wherein each of the plurality of logical indicators is mapped to one of a plurality of pieces of orthogonal code information generated for each possible case of orthogonal code assignment.

15. The method of claim 12, wherein the orthogonal codes are OVSF (Orthogonal Variable Spreading Factor) codes.

16. A method of receiving information about assigned orthogonal codes, a successive orthogonal codes, for an HSDPA (High Speed Data Packet Access) communication system having a maximum number of orthogonal codes N for spreading the HSDPA data, the method comprising the steps of:

detecting an offset indicating a starting point of the assigned orthogonal codes from the first orthogonal code of the N number of orthogonal codes and a number of orthogonal codes being assigned; and receiving a user data on a assigned code channels using the assigned orthogonal codes.

17. The method of claim 16, wherein at least one of the offset and the number of orthogonal codes consists of a number of bits indicating the maximum number of orthogonal codes N.

18. The method of claim 16, wherein one of the offset and the number of orthogonal codes is represented by a first number of bits equal to a number of bits used for indicating the maximum number of codes N and the other is represented by a second number of bits which is 1 bit smaller than the first number of bits.

* * * * *